Patented Apr. 22, 1952

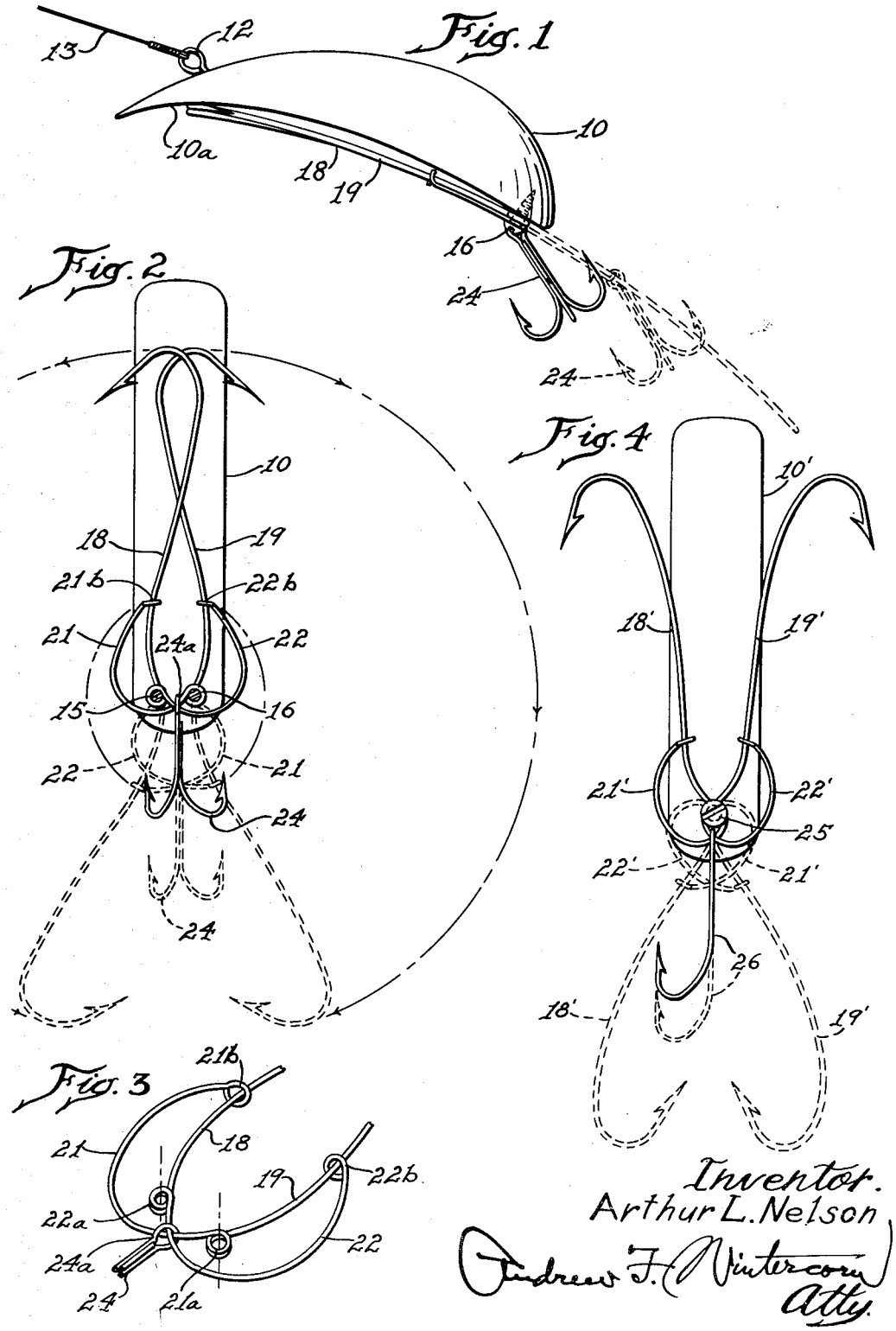

2,593,476

UNITED STATES PATENT OFFICE 2,593,476

ARTIFICIAL FISH BAIT

Arthur L. Nelson, Rockford, Ill.

Application March 16, 1950, Serial No. 149,932

9 Claims. (Cl. 43—35)

This invention relates to fishing tackle and has to do more especially with improvements in artificially bait; its principal object being to provide an article of that character from which the quarry, once hooked, has little or no chance of escape, the operation being such that the more the fish pulls in its struggle to get away, the more tightly it becomes gripped.

Another object is to provide an artificial bait, including a lure, having supplementary or secondary hooks which are normally concealed by the lure and which function co-operatively as gaffs, once the quarry has become impaled on the primary hook.

Additional objects and innate advantages of my invention will become apparent as the ensuing detailed description progresses.

In the drawing which accompanies this specification:

Fig. 1 is a side elevational view of an artificial bait according to what I presently consider to be the preferred embodiment of the invention;

Fig. 2 is a front or lower elevational view of the same;

Fig. 3 is an enlarged perspective detail; and

Fig. 4 is an elevational view illustrating a modification or alternative construction.

Referring first to Figs. 1–3 inclusive, the artificial bait therein illustrated comprises a lure 10 of any appropriate configuration such as that shown, made usually of wood or metal or plastic material. The forward end of the lure is provided with an eyelet 12 to which is shown attached a fishing line or leader 13.

Two woodscrews 15 and 16 are threaded into the lure 10 at a point near its rear end. These are spaced apart laterally of the lure, as clearly shown in Fig. 2, and they function both as pivots and fastening means as will presently be fully explained.

Two identical, elongate, spring-wire supplemental or secondary hooks 18 and 19 are each looped at one end to form an eyelet which loosely embraces one of the two woodscrews 15 or 16—the eyelet of hook 18 embracing screw 15 and the eyelet of hook 19 embracing screw 16. Normally, the two supplemental or secondary hooks 18 and 19 are disposed as shown in Figs. 1 and 2; and when so arranged they bear lightly against each other and against the adjacent surface 10a of the lure. Thus, they are held frictionally in their normal postures, but subject to displacement in the manner hereinafter described.

Two identical spring-wire arms 21 and 22 are each looped at one end to form an eyelet 21a, 22a—see Fig. 3—which loosely embraces one of the two woodscrews 15 or 16; and each also is looped at its other end to form an eyelet 21b, 22b which loosely embraces the shank of one of the two supplemental hooks 18 or 19, individually. Specifically, the eyelet 21a embraces screw 16 and eyelet 22a embraces screw 15, while the eyelet 21b embraces the shank of supplemental hook 18 and the eyelet 22b embraces the shank of supplemental hook 19.

A primary hook 24—which is here shown as a triple gang hook—has an eyelet 24a which loosely embraces the two arms 21 and 22 at their intersection, as most clearly illustrated in Fig. 3.

As will be apparent upon inspection, when a fish strikes at the lure and consequently becomes impaled upon the primary hook 24—which may be either a gang hook, as shown, or a single hook—it normally will attempt to retreat and in so doing will apply tension to the primary hook, which tension is, in turn, applied to the two arms 21 and 22 in such manner as to cause them to rotate about their respective fulcrums from the normal postures in which they are shown in full lines—Fig. 2—to that in which they are shown in dotted outline in the same figure. The above-described rotation of arms 21 and 22 is necessarily accompanied by movement of the two supplemental hooks 18 and 19 about their respective fulcrums—since the distal ends of the two arms are connected to the shanks of the said supplemental hooks through the medium of eyelets 21b and 22b—and it will be manifest that as the supplemental hooks approach their operative positions in which they are shown in dotted outline in Fig. 2, their barbed ends will pierce the head or body of the fish at opposite sides, making escape virtually impossible, unless the pull on the line is sufficiently powerful to break it.

The alternative construction illustrated in Fig. 4 is operatively similar to that of Figs. 1–3 but differs therefrom structurally in that all of the four pivoted elements 18', 19', 21' and 22' have a common fulcrum. Instead of the two woodscrews 15 and 16, there has been substituted a single woodscrew 25 which, as in the former case, is threaded into the lure. I have also shown in Fig. 4 a single-barb primary hook 26 in place of the triple gang hook 24. As will at once be evident, a gang hook may be used in the construction of Fig. 4 and, similarly, a single-barb primary hook may be employed in the construction of Figs. 1–3.

I believe it will be abundantly clear to experienced fishermen that the subject invention affords an artificial bait which can be depended upon to prevent escape of any catch which is not heavy or powerful enough to break the line; which will not readily become fouled in weeds or the like; and which, by virtue of the normally retracted positions of the supplemental hooks, does not tend to frighten the quarry.

Obviously, there are various possible additional modifications within the scope and purview of my inventive concept and, accordingly, I do not wish to be limited otherwise than as plainly indicated by the terms of the appended claims.

Having described my invention and its mode of operation, what I claim as new and wish to secure by Letters Patent is:

1. Fishing tackle comprising, in combination, a lure having means at its forward end for connection to a fishing line, a primary hook, two supplemental hooks each pivoted on said lure at the end thereof remote from the hook point, and two arms, each arm being pivoted on said lure at one end and having its other end slidably connected with the shank of one of the supplemental hooks, said primary hook being loosely coupled to both said arms, conjointly, said supplemental hooks being normally extended forwardly from their pivots, the arrangement being such that tensile force applied to the primary hook by a quarry is effective through said arms to rotate the supplemental hooks about their pivots away from their normal positions and into hooking engagement with the quarry.

2. Artificial bait comprising, in combination, a lure having means at its forward end for connection to a fishing line, a primary hook, two supplemental hooks each pivoted to the rearward end portion of the lure, the pivot of each supplemental hook being at the end thereof remote from its point, said supplemental hooks being so disposed that they normally extend forwardly from their pivots and are engaged by the lure so that they are yieldably retained in their normal positions, and two bowed arms mutually crossed and each pivotally connected to the lure at one end and having its other end slidably coupled to one of the supplemental hooks, said primary hook being slidably coupled to both said arms and normally extended rearwardly from the lure, the arrangement being such that tensile force applied to the primary hook by a quarry is transmitted to said arms and thence to the supplemental hooks in a manner effective to rotate the supplemental hooks about their pivots away from their normal positions and into hooking engagement with the quarry.

3. Artificial bait comprising, in combination, a lure having means at its forward end for connection to a fishing line, a primary hook having an eye at the end thereof remote from its point, two complementary supplemental hooks pivoted at laterally spaced centers to the rearward end portion of the lure, the pivot of each supplemental hook being at the end thereof remote from its point, said supplemental hooks being so disposed that they normally extend forwardly from their pivots and are engaged by the lure so that they are yieldably retained in their normal positions, and two bowed arms, each said arm having one end pivoted at one of said pivots individually and having its other end slidably connected to the supplemental arm which is pivoted at the other said pivot, said arms being disposed crosswise of each other and both passing slidably through the eye of the primary hook.

4. Artificial bait according to claim 3 wherein each said arm extends rearwardly of the lure adjacent its pivot and is so curved that the end remote from the pivot is forward of the pivot when the supplemental hooks are in their normal retracted positions.

5. Artificial bait comprising, in combination, a lure having means at its forward end for connection to a fishing line, a primary hook, two supplemental hooks each pivoted to the rearward end portion of the lure and having a common pivot, said supplemental hooks being so disposed that they normally extend forwardly from their common pivot, and two arms, each having one end pivoted at said pivot and each so curved that they cross each other rearwardly of the pivot, the other end of each arm having an eye slidably embracing one of said supplemental hooks individually at a point which is forward of the pivot when the supplemental hooks are in their normal retracted positions, said primary hook being slidably coupled to both said arms.

6. An artificial bait comprising a lure having means at its forward end for connection to a fishing line, a primary hook, two gaff hooks pivoted on said lure so as to be swingable from a retracted forwardly extending position with their hooked ends facing outwardly away from each other to an operative rearwardly extending position with their hooked ends facing inwardly toward each other, a pair of elongated members for operating said gaff hooks, each pivotally connected at one end on said lure and slidably connected intermediate its ends with the primary hook and operatively connected at its other end with one of said gaff hooks near the pivoted end thereof.

7. An artificial bait comprising a lure having means at its forward end for connection to a fishing line, a primary hook, two gaff hooks pivoted on said lure so as to be swingable from a retracted forwardly extending position with their hooked ends facing outwardly away from each other to an operative rearwardly extending position with their hooked ends facing inwardly toward each other, and a pair of bowed elongated members pivoted at one end on said lure and extending in criss-cross relation to one another and each operatively connected at the other end to one of said gaff hooks near the pivoted end thereof, said elongated members being slidably connected at their crossing with the primary hook.

8. An artificial bait comprising, in combination, a lure having means at its forward end for connection to a fishing line, a relatively short primary hook, two relatively long gaff hooks pivoted to the rear end portion of the lure and swingable from a retracted forwardly extending position in which their hooked ends extend outwardly away from each other to an operative rearwardly extending position in which their hooked ends face inwardly toward each other, and means linking the primary hook with the gaff hooks near the pivoted ends thereof so that a rearward pull on the primary hook swings the gaff hooks to operative position and draws them inwardly toward each other.

9. An artificial bait comprising, in combination, a lure having means at its forward end for connection to a fishing line, a relatively short primary hook, two relatively long gaff hooks pivoted to the rear end portion of the lure and swingable from a retracted forwardly extending position in which their hooked ends extend outwardly away from each other to an operative rearwardly extending position in which their hooked ends face inwardly toward each other, and means providing a sliding fulcrum link connection between the primary hook and the gaff hooks, whereby the gaff hooks are given initially a relatively large angle of swinging movement with low mechanical advantage upon an initial pull on the primary hook and thereafter a gradually decreasing angle of swinging movement with gradually increased mechanical advantage in the further pull on the primary hook.

ARTHUR L. NELSON.

REFERENCES CITED

The following references are of record in the file of this patent:

UNITED STATES PATENTS

| Number | Name | Date |
|---|---|---|
| 1,920,991 | Lahm | Aug. 8, 1933 |
| 2,044,702 | Kalyu | June 16, 1936 |